US007221843B2

(12) United States Patent
Aalto

(10) Patent No.: US 7,221,843 B2
(45) Date of Patent: May 22, 2007

(54) OPTICAL WAVEGUIDE

(75) Inventor: Timo Aalto, Helsinki (FI)

(73) Assignee: Valtion Teknillinen Tutkimuskeskus, Espoo (FI)

( * ) Notice: Subject to any disclaimer, the term of this patent is extended or adjusted under 35 U.S.C. 154(b) by 84 days.

(21) Appl. No.: 10/510,746

(22) PCT Filed: Apr. 11, 2003

(86) PCT No.: PCT/FI03/00279

§ 371 (c)(1),
(2), (4) Date: May 6, 2005

(87) PCT Pub. No.: WO03/085430

PCT Pub. Date: Oct. 16, 2003

(65) Prior Publication Data

US 2005/0213912 A1    Sep. 29, 2005

(30) Foreign Application Priority Data

Apr. 11, 2002  (FI) .................................. 20020698

(51) Int. Cl.
*G02B 6/10* (2006.01)
*G02B 6/26* (2006.01)
*G02B 6/42* (2006.01)

(52) U.S. Cl. .......................... 385/129; 385/14; 385/39; 385/43; 385/28; 385/50; 385/130; 385/132

(58) Field of Classification Search .................. 385/28, 385/39, 43, 50, 129, 130, 132, 14
See application file for complete search history.

(56) References Cited

U.S. PATENT DOCUMENTS

| 4,999,686 A | 3/1991 | Autier et al. |
| 5,078,516 A | 1/1992 | Kapon et al. |
| 6,571,039 B1 * | 5/2003 | Al-hemyari et al. .......... 385/43 |

FOREIGN PATENT DOCUMENTS

| WO | WO 98/35250 | 8/1998 |
| WO | WO 01/27670 | 4/2001 |

* cited by examiner

*Primary Examiner*—Frank G. Font
*Assistant Examiner*—Michael P. Mooney
(74) *Attorney, Agent, or Firm*—Young & Thompson

(57) ABSTRACT

A waveguide, which is part of an integrated optical circuit is arranged onto a planar substrate, and has a core section propagating light to a direction of propagation. The waveguide is a conversion waveguide between a ridge-type waveguide and a strip waveguide. In the conversion waveguide, the core section is made of the one and same material so that the cross-section of the core section transverse to the direction of propagation of light is two-step from both edges. The conversion waveguide has two layers of different widths so that the height of the first layer is equal to the height of the ridge of the ridge-type waveguide, and the height of the second layer is equal to the height of the base part of the ridge-type waveguide.

8 Claims, 6 Drawing Sheets

PRIOR ART

OPTICAL WAVEGUIDE

The invention relates to an optical waveguide according to preamble of claim 1, the optical waveguide being part of an integrated optical circuit.

The invention also relates to a method according to preamble 5 for manufacturing an optical waveguide for an integrated optical circuit.

An integrated circuit consists of a set of optical circuit elements, devices and/or external connections, which are irremovably connected to each other by optical waveguides and which are arranged onto a common substrate. For example, light sources and detectors, power splitters, switches, wavelength multiplexers and demultiplexers, and fiber connections can be circuit elements. They have been manufactured either by the same or a different method as the optical waveguides connecting them.

In the following, waveguide refers to a three-dimensional structure arranged onto a planar substrate, which transfers light from one place to another in an integrated circuit. The direction of the waveguide in the plane of the substrate can be constant, or it can change either in a slowly curving or suddenly turning manner. The cross-section of the waveguide can be either constant, or it can change slowly or suddenly. There are often several such different waveguide sections sequentially. The basic material of the substrate is, for example, silicon, compound semiconductor or glass. The material of the waveguide can be, for example, silicon, compound semiconductor, glass or organic substance.

The waveguide has a certain three-dimensional refractive index distribution $n(x, y, z)$, which together with material absorption determines how light with a certain wavelength $\lambda$ travels in the waveguide and what are its propagation losses. The used wavelength $\lambda$ of light, generally optical radiation, extends from visible to near-infrared.

The crosssection of the waveguide is in a plane perpendicular to the direction of light propagation, i.e. the z-axis or the z-direction. The crosssection of a straight waveguide is constant, and its refractive index distribution $n(x, y)$ is substantially two-dimensional. On the basis of the cross-section, the number of discrete propagating modes in a straight waveguide, the effective indexes and transverse field distributions can be theoretically calculated. The calculations are usually made numerically, as an analytic solution is generally not available. The effective index describes the speed of light coupled to the mode along the waveguide, as the refractive index of the material describes the speed of an optical plane wave in it. The modes can generally be divided into two groups according to their polarisation, the difference of which depends on the asymmetry of the waveguide and/or the birefringence of the materials. For simplifying the description, only modes of the so-called TE (quasi transverse electric) type are examined next, but all principles also apply to other polarisation modes, such as modes of the TM (quasi transverse magnetic) type.

A special case of a straight waveguide is a so-called slab waveguide, which has not been patterned in the horizontal direction, i.e. the x direction along the substrate surface. The refractive index distribution $n(y)$ of the slab waveguide is substantially unidimensional, and it corresponds either to an infinitely wide or narrow straight waveguide. The number of discrete propagating modes, effective indexes and vertical field distributions can be calculated for the slab waveguide with the same principle as for finitely wide waveguides, but more simply.

The propagation of modes in a straight waveguide is based on total internal reflection between the core area of the waveguide and the areas surrounding it both in horizontal and vertical direction. This requires that the refractive index of the core area is higher than the refractive index of the materials surrounding it. When a ridge-type waveguide or a similar structure is concerned, a so-called effective index difference can replace the refractive index difference of the materials in either direction. In practice, material absorption and scattering from non-ideal material interfaces also influence the propagation. In addition to propagating modes, an infinite number of so-called radiation modes, which are not based on total internal reflection, can be calculated for a straight waveguide. An arbitrary optical field distribution coupled to a straight waveguide can be unambiguously presented as a weighted sum of propagating and radiation modes. The power connected to radiation modes gradually radiates away from the waveguide.

Other than straight waveguides do not generally have propagating modes that have constant transverse power distributions and no continuous radiation of power away from the core area. On the basis of cylinder symmetry, discrete modes with curvilinear propagation can be calculated for waveguides with a constant bending radius, but the finitely attenuating field distributions of all bent waveguides radiate power to the direction of the outer curve/see reference publications 1, 2/. Also the operation of other waveguides besides straight ones can be presented with the help of modes, but for them the number and effective indexes of modes, the field distributions of the modes and/or the power ratios of the modes can change. As the cross-section changes or the direction of the waveguide changes, optical power is usually coupled between modes. However, in so-called adiabatic waveguide structures, which change sufficiently slowly in the direction of propagation, power is never transferred from one mode to another, but the power stays in the same waveguide mode that slowly changes its field distribution.

The cross-section of a straight waveguide is aimed to be arranged so that it allows at the least the so-called fundamental mode, the mode number m of which is 0, to propagate in the waveguide and, most preferably, with as small losses as possible. A waveguide with only one propagating mode (m=0) is called a single-moded (SM) waveguide. An waveguide with more than one propagating mode (the mode numbers m=0, 1, 2, . . . ) is called a multi-moded (MM) waveguide. In a multi-moded waveguide power is not necessarily transferred from the fundamental mode to higher modes. A single-moded waveguide connection can consist, for example, of single-moded waveguide sections and multi-moded, but adiabatic waveguide sections between them/ reference publication 2/. Especially in telecommunications technology, integrated optical circuits generally have to be single-moded, when examined externally. More complex integrated optical circuit elements (power splitters, etc.) often consist of multi-moded waveguide structures even in single-moded systems.

A straight waveguide $1$; $4$, which is arranged onto a planar substrate $2$, is previously known and illustrated in FIGS. 1 and 2. The waveguide has a rib $1^1$; $4^1$ patterned to the core material and propagating light to a certain linear direction. The side walls of the rib need not necessarily be vertical, but they can also be, for example, oblique or rounded. Between the rib and the substrate there is one or several material layers. Corespondingly, one or several material layers $3$ can be at the sides of the rib. The material layers can be solid, liquid or gaseous material. However, the refractive index distribution of the cross-section of the waveguide is always such that it enables at least one propagating mode. Only those material layers and areas, to which the optical power distribution of at least one propagating mode extends, are generally included in the theoretical waveguide structure, both in the horizontal and vertical direction. At the same time, the outermost material layers and areas are assumed to extend infinitely far away.

In one known waveguide 1, FIG. 1, the refractive index of the rib $1^1$ is bigger than the refractive indexes of the surrounding materials. Irrespective of the form of the side walls, such an waveguide is in the following called a strip waveguide. In it light usually experiences total internal reflection on the horizontal and vertical surfaces limiting the rib. If there are several material layers above or below the rib, the total internal reflection can alternatively occur only on some outer interface. If the layers above and below the strip waveguide have the same or at least almost the same refractive indexes, and if its side walls are vertical, the waveguide structure is symmetrical, besides the horizontal direction, also in the vertical direction. In this case, also the field distribution of the fundamental mode of the strip waveguide is symmetrical in the vertical direction.

In a second known waveguide 4, FIG. 2, the rib (or ridge) $4^1$ is seamlessly arranged onto a thin unpatterned layer of the same core material, i.e. the base element $4^2$ The rib $4^1$ and the base element $4^2$ form the ridge-type waveguide 4. In the ridge-type waveguide, the vertical total internal reflection occurs on the horizontal material interfaces following the same principle as in the strip waveguide. However, the horizontal total internal reflection is based on the so-called effective index difference/see reference publication 1/. In the case of vertical side walls, the approximative effective index difference is obtained by comparing the effective indexes calculated for the vertical unidimensional refractive index distributions at the center and side of the rib. However, for an exact waveguide analysis it is necessary to resort to twodimensional numerical methods. The refractive index structure of the ridge-type waveguide is asymmetrical in the vertical direction, and because of this, also the field distribution of its fundamental mode is asymmetrical in the vertical direction. As the effective index difference of the ridge-type waveguide decreases, for example, upon narrowing or lowering the rib, the asymmetry of its field distribution increases simultaneously in the vertical direction.

The basis in a known method, the etching method, for manufacturing one or several waveguides to be arranged to an optical integrated circuit, is a planar substrate, onto which an initially unpatterned core layer of the waveguide is prearranged, as well as one or several material layers. The topmost layer, the so-called resist layer, is patterned by one or several known alternative methods so that a so-called process pattern is reproduced to it as a resist mask. Known resist patterning methods are presented below. The process pattern refers to a two-dimensional pattern which determines from which areas of the substrate the resist will be removed and to which areas it will be left. At its simplest, the light controlling structure is a straight waveguide, in which the process pattern comprises a line of constant width. Generally one process pattern nevertheless presents all waveguide structures to be processed to one substrate. In the etching phase, the structure on top of the substrate is etched by using one of the several known methods so that the patterned resist mask protects the parts of the material layer or layers beneath it, and the process pattern is thus reproduced to the said layers. Known etching methods are, among others, wet and dry etching. A preferable dry etching method is ICP (inductively coupled plasma) etching. If there is one or several so-called hard mask layers between the resist and core material, the etching of the structure is performed in several different phases. In this case, the pattern of the resist mask is first produced to the first hard mask layer by etching. The generated structure can then be used as a new mask in the etching of the next hard mask layer, and so on. After the patterning of the last hard mask layer, the rib is finally patterned to the core material layer by etching. Between and after the etchings, upper resist or hard mask layers can be removed by material selective intermediate etching phases. After the patterning of the rib, cladding material layers can be grown or otherwise formed on top of and to the sides of the rib.

Known resist patterning methods are, among others, optical lithography, electron beam lithography, phase mask lithography, and mechanical imprint technology. The use of the preferable optical lithography in the etching method is next described in more detail. In optical lithography, the process pattern is first formed to the surface of a separate glass plate to provide a socalled exposure mask. A material sensitive to light, such as ultraviolet light, is used as the resist layer. A certain section of the surface of the substrate is covered by the metal patterns of the exposure mask, and the uncovered sections of the surface are exposed to UV light. In the development of the resist, the resist is removed either from the exposed or unexposed areas, depending on the resist process used.

The basis in a second known method, the growing method, in the manufacture of one or several waveguides to be arranged to an optical integrated circuit is a substrate, onto which an waveguide with the desired properties is grown of one or several materials. In the growing method, a structure controlling the growing is usually formed to the substrate by using the etching method before the growing, the structure directing the growing of new material layers only to the desired places.

A drawback in the above mentioned known waveguides and their manufacturing methods is the deficiency in their versatility. In all of them, only one process pattern is used for determining one waveguide, in which case the width of the waveguide, the effective index difference, the number of modes and the symmetry/asymmetry of the field distribution cannot be freely determined separately.

The object of the invention is to eliminate the drawbacks related to the above disclosed waveguides applicable to integrated optics. The object of the invention is also to achieve a new waveguide and a new method for its manufacture.

The waveguide of the invention is characterised in what is disclosed in claim 1.

The method of the invention for manufacturing a waveguide of an integrated optical circuit is characterised in what is disclosed in claim 5.

The dependent claims disclose advantageous embodiments of the invention.

The waveguide according to the invention is part of an integrated optical circuit, the waveguide being arranged onto a planar substrate and including a core element propagating light to a certain direction, the direction of propagation.

In accordance with the invention, the waveguide is a conversion waveguide between the ridge-type waveguide and the strip waveguide, the core element in the conversion waveguide being manufactured of the one and same material so that its cross-section transverse to the direction of propagation of light is two-stepped on both sides, and the conversion waveguide containing two layers of different widths, the height of the first layer being equal to the height of the ridge in the ridge-type waveguide, and the height of the second layer being equal to the height of the base section of the ridge-type waveguide, the sum of the heights of the layers being equal to the height of the strip waveguide and the widths of the two layers being arranged to change uniformly between the waveguides to be connected for fitting them in the lateral direction.

The core section of the waveguide according to the invention forms a rib with respect to the substrate, the both longitudinal sides of which consist of two steps, each single step being provided with a wall and a corresponding stair plane. The steps are then formed of alternately repeating walls and stair planes. It has to be noted that the walls are not necessarily vertical, but they can be, for example, oblique or rounded. Respectively, the stair planes of the steps are not necessarily straight, especially horizontal, planes, because also they can be oblique and/or rounded. However, adjacent steps are separately identifiable, and their location is determined either on the basis of different process patterns or different process pattern combinations.

The waveguide of the invention is most preferably made onto a semiconductor substrate, especially a silicon wafer. The waveguide is processed onto a planar substrate and especially into a light-propagating core layer on top of it, most preferably by a method of the invention.

The advantage of the invention is that it enables an adiabatic conversion of the waveguide type from a ridge waveguide to a strip waveguide. In structures with a large refractive index difference and coarsely identical dimensions larger than the wavelength, the ridge-type waveguide can be single-moded and the respective strip waveguide clearly multi-moded. Because of the invention, simple variations from single-moded waveguides to multi-moded waveguides are possible both in the vertical and horizontal direction.

The advantage of the waveguide of the invention also is that with the help of it, the small effective index difference of the ridge-type waveguide can be adiabatically changed to the very large effective index difference of the strip waveguide.

The strip waveguides with a large effective index difference have considerable advantages, compared with the ridge-type waveguides with a small effective index difference. They can, for example, provide very small waveguide bends with small losses, and so-called waveguide mirrors steeply changing the direction of light based on total internal reflection. With them it is also possible to provide considerably more propagating, especially horizontal, modes to a waveguide of a certain width. This large number of horizontal modes can be utilised, for example, for reducing the size of socalled multimode interference couplers (MMI couplers), which are based on the controlled interference between horizontal modes. The length of an MMI coupler grows generally quadratically in relation to the width of an MMI waveguide, and the minimum of the width is again determined on the basis of the minimum number of required modes. In the strip waveguide, the large number of modes makes it possible to use clearly narrower MMI waveguides so that the length of the MMI coupler can be considerably shortened. When coupling light to the MMI waveguide and away from it, it is however always necessary to make sure that light is not coupled to higher order vertical modes at any stage.

An advantage of the waveguide of the invention is also that with it components based on strip waveguides, such as small-sized waveguide bends, waveguide mirrors and short MMI couplers, can be adiabatically inserted between single-moded ridge-type waveguides. Such waveguide connections can operate externally single-moded.

An advantage of the waveguide of the invention is also that the vertically asymmetric field distribution of a ridge-type waveguide can be changed to a vertically symmetric field distribution of a strip waveguide. Vertical symmetry can be utilised, among others, for decreasing the attenuation of MMI couplers and/or for reducing their size. As has been stated above, a strip waveguide is better suitable for providing short MMI couplers than a ridge-type waveguide. If a ridge-type waveguide is directly connected to the a strip MMI waveguide, the vertical asymmetry of the ridge-type waveguide and the vertical symmetry of the strip waveguide cause between them a detrimental coupling of light to higher order vertical modes. By using the conversion waveguide of the invention between the ridge-type waveguide and the strip MMI waveguide, small MMI couplers can be connected to the ridge-type waveguides without the coupling problem mentioned above.

The method of the invention is directed to the manufacture of an waveguide of an integrated optical circuit onto a substrate. According to the invention, the waveguide is a conversion waveguide, which is manufactured between the ridge-type and strip waveguides onto such a planar substrate, on which there is provided a light propagating core layer, in which method the core layer is controllably thinned in two phases for forming two different steps on both sides of the conversion waveguide so that during the two thinning phases a different process pattern is utilised, the edges of which determine the location of the step edges of the waveguide on the substrate so that the result is a two-step waveguide structure from both sides in the direction transverse to the direction of propagation of light, and in which the conversion waveguide is provided with two layers of different widths, the height of the first layer being arranged equal to the height of the ridge in the ridge-type waveguide and the height of the second layer being arranged equal to the base part of the ridge-type waveguide, and in which the sum of the heights of the layers is arranged equal to the height of the strip waveguide, and the widths of the two layers are arranged to change uniformly between the waveguides to be connected for fitting them in the lateral direction. The ridge-type waveguide and the rectancular waveguide are both determined with the help of one process pattern only. However, the waveguide of the invention, i.e. the conversion waveguide is determined with the help of the combination of two different process patterns.

The dependent claims disclose advantageous embodiments of the invention.

An advantage of the method of the invention is that with it the ridge-type waveguide can be adiabatically changed to the strip waveguide in a reliable and easy way and with small power losses.

An advantage of the method of the invention is also that it is not especially sensitive to alignment errors occurring between different process patterns.

The invention and its other advantages are next explained in more detail, referring to the enclosed drawings, in which FIG. 1 is a cross-section of a first waveguide according to the state of the art, i.e. a strip waveguide;

The invention relates to a waveguide, which is part of an optical integrated circuit. The waveguide has a core element propagating light to a certain direction, the direction of propagation. The waveguide, especially its two-step core element, is arranged onto a planar substrate 7, FIG. 3. The refractive index of the layer or material below the core element on the wavelength in question is smaller than the corresponding refractive index of the core element. For example, a photolithographic method, FIG. 4, is used in the manufacture of the waveguide of the invention, the method being explained in more detail later in this application.

In an advantageous embodiment of the invention, the common support is most preferably a support made of semiconductor, such as a semiconductor wafer that is generally used also as a support for electronic integrated circuits. The support works as a physical foundation, onto which a number of integrated optical circuits are arranged.

Figure 1:
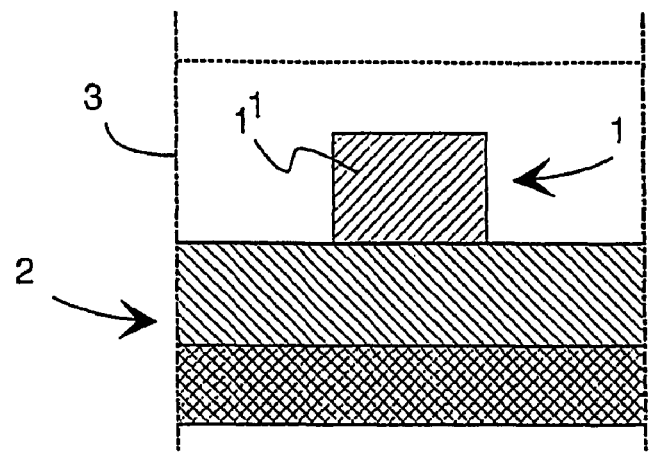
Figure 2:
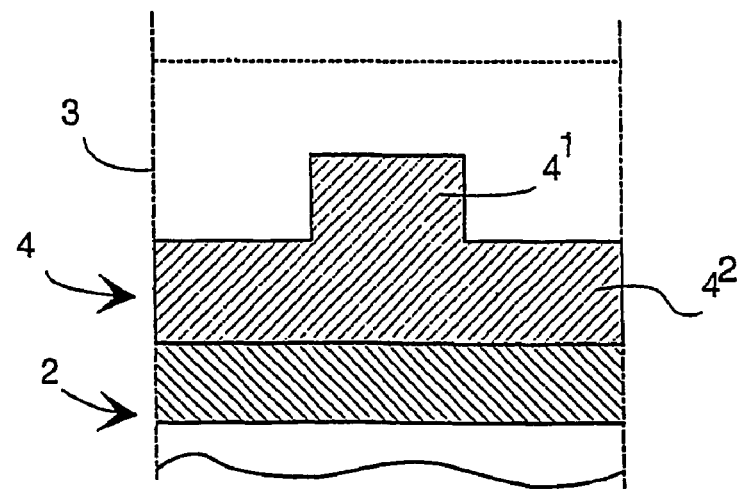
FIG. 2 is a cross-section of a second waveguide according to the state of the art, i.e. a ridge-type waveguide.
Figure 3:
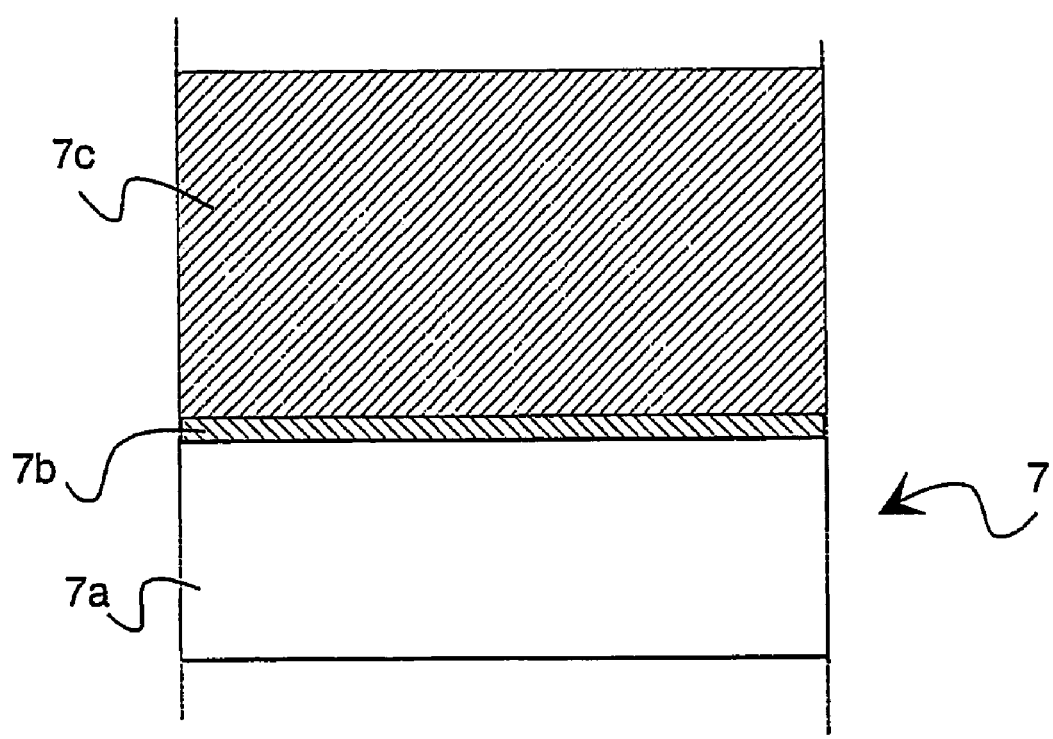
FIG. 3 is a cross-section of the substrate.
Figure 4:
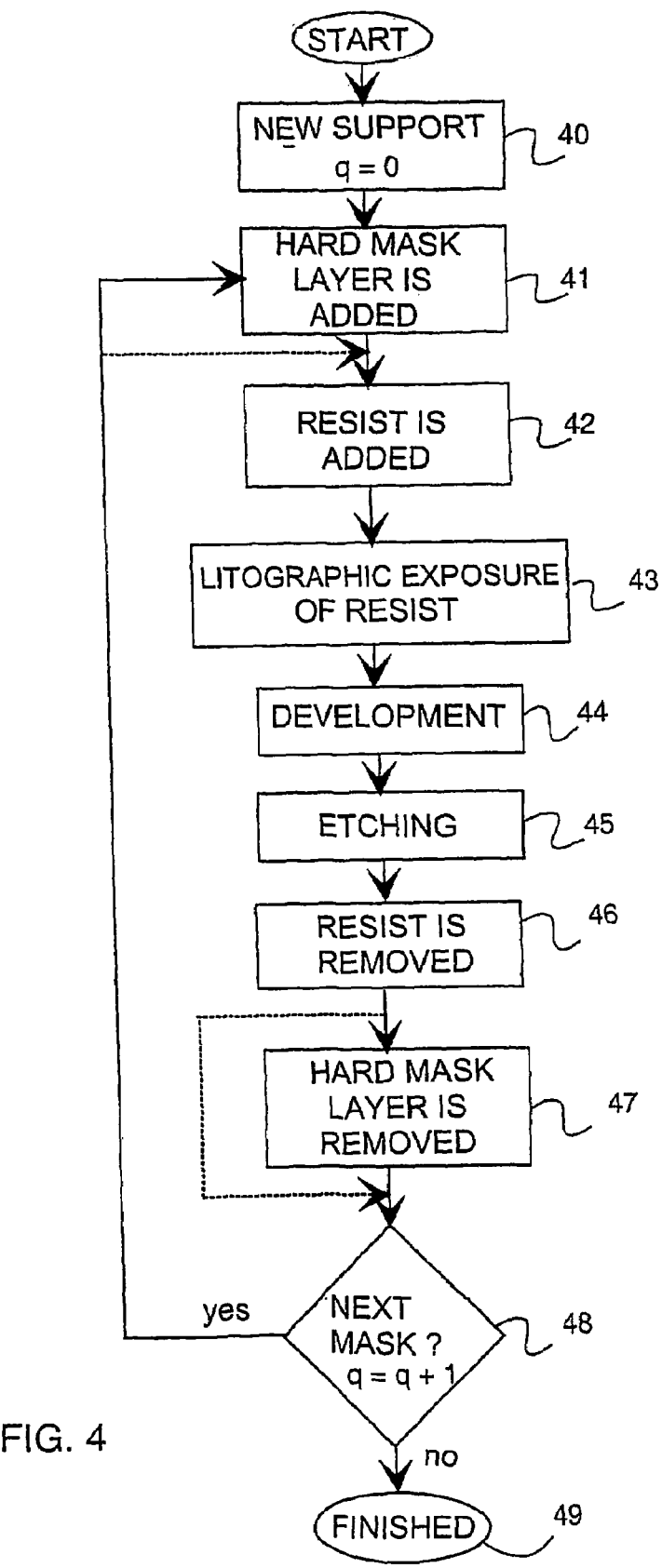
FIG. 4 is a block diagram of the method for manufacturing the waveguide in phases.

The substrate 7 of the waveguide, FIG. 3, is preferably a SOI (silicon on insulator) wafer. The SOI wafer consists of a thick silicon wafer 7a, on which there first is a thin silicon oxide layer 7b, and on top of that a thin core layer 7c of silicon. The oxide layer 7b acts as a so-called buffer layer, which optically insulates the core layer 7c from the silicon wafer below, due to its refractive index, which is smaller than that of silicon. The thickness of the oxide layer 7b is typically 0.5–3 µm, but it can also be as much as 1–15 µm. The refractive index of silicon is about n=3.5 and, respectively, the refractive index of silicon is about $n_a$=1.5, depending on the wavelength of light. The wavelength λ of the light used is about 1–2 µm, preferably, for example, 1.55 µm. FIG. 3 presents a SOI wafer, but alternatively, also several different single- or multi-layer structures can be used as the substrate. Instead of silicon, for example, gallium arsenide (GaAs) or other respective material can be alternatively used as the material for the core layer.

Figure 6:
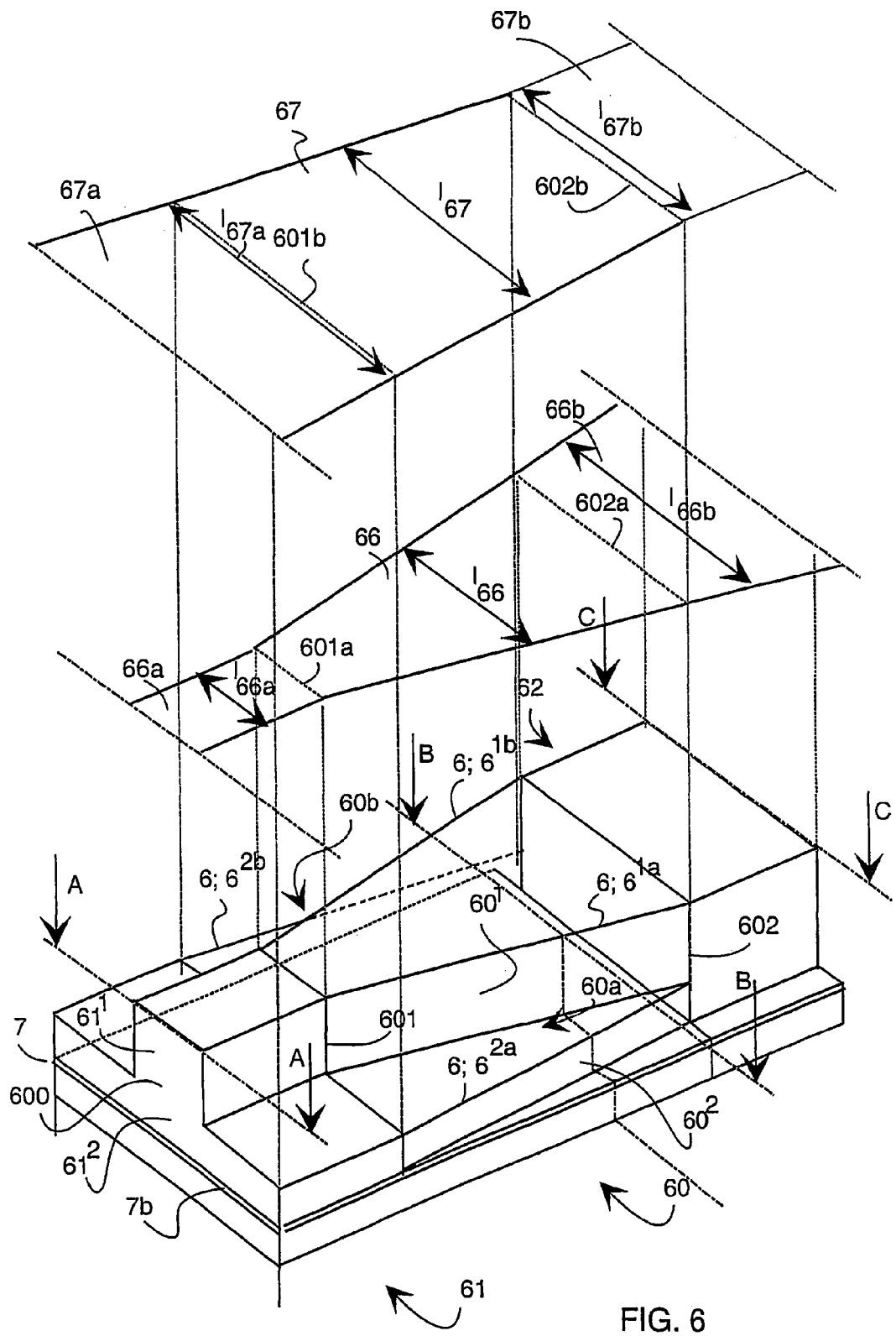
FIG. 6 is a perspective view of the waveguide of the invention, with the help of which the ridge-type waveguide can be converted to the strip waveguide, or vice versa.

In the method of the invention, the waveguide 60, FIG. 6, is manufactured onto a suitable finished substrate 7, FIG. 3, such as a SOI wafer, on which there already is a light propagating core layer 7c. In the method of the invention, the waveguide 60, especially its core element 600, is made so that the core layer 7c on the substrate is controllably thinned in two different phases for forming the different steps 6; $6^{1a}$ $6^{2a}$ $6^{3a}$ $6^{1b}$ $6^{2b}$ $6^{3b}$ and the layers $60^1$, $60^2$, a different process pattern being utilised in both thinning phases, the area dimensions of which, i.e. width and length, correspond to the area dimensions of the different layers of the waveguide so that the result obtained is an waveguide structure twostep from both edges, transverse to the direction of propagation of light. Thus, the edges of the different process patterns determine the location of the edges of the steps of the waveguide in the core layer 7c on top of the substrate. At the same time, also other possible integrated waveguides related to the waveguide 60 are prepared.

Figure 7A:
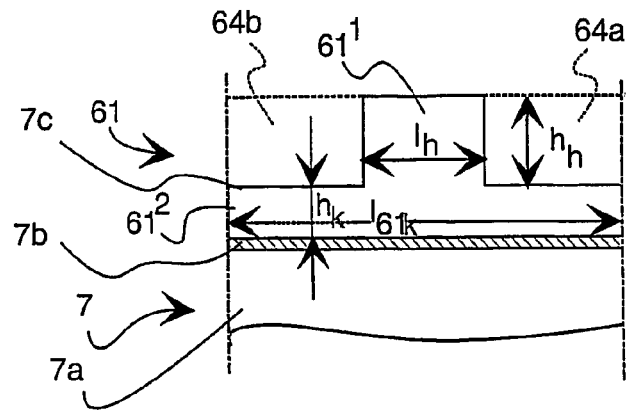
FIGS. 7A, 7B, 7C are cross-sections A—A, B—B and C—C of the waveguide in FIG. 6, respectively.
Figure 7B:
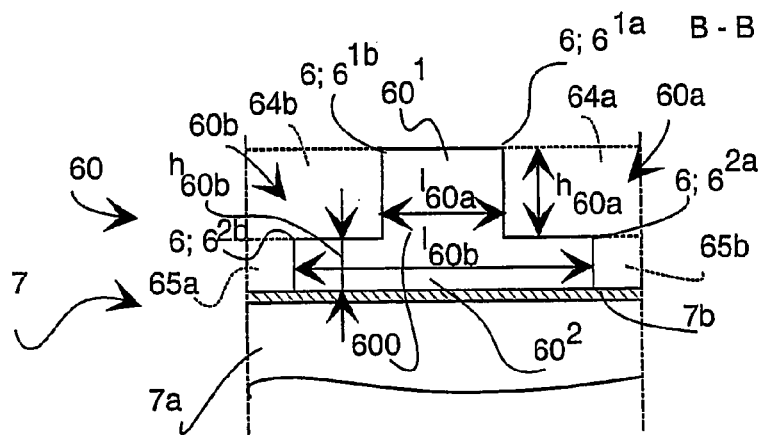
Figure 7C:
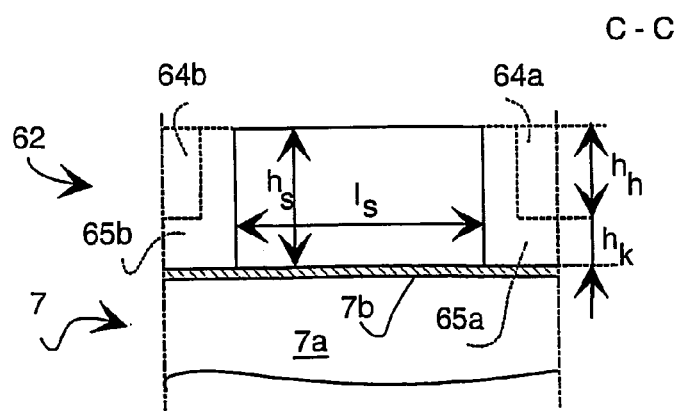

The waveguide 60 of the invention is illustrated as a perspective view in FIG. 6, and its crosssections are illustrated in FIGS. 7A, 78 and 7C. The waveguide 60 is a conversion waveguide, which is arranged between the ridge-type waveguide 61 and the strip waveguide 62, which are known as such.

In the waveguide 60 of the invention, there are two successive and seamless material layers $60^1$, $60^2$ made of the same material, which form the core element 600. The layers $60^1$, $60^2$ of the waveguide 60 have different widths $1^{60a}$, $1^{60b}$ so that the steps 6; $6^{1a}$ $6^{2a}$; $6^{1b}$, $6^{2b}$ are formed to the edges 60a, 60b of the waveguide 60. The waveguide 60 can also be surrounded by a cladding (not shown in the figures) This cladding can be made of a suitable solid material, which is added onto the waveguide 60 in connection of the manufacture, or it can be a gaseous cladding, such as surrounding air, or even a liquid cladding. The cladding can also consist of more than one layer or material.

Figure 5A:
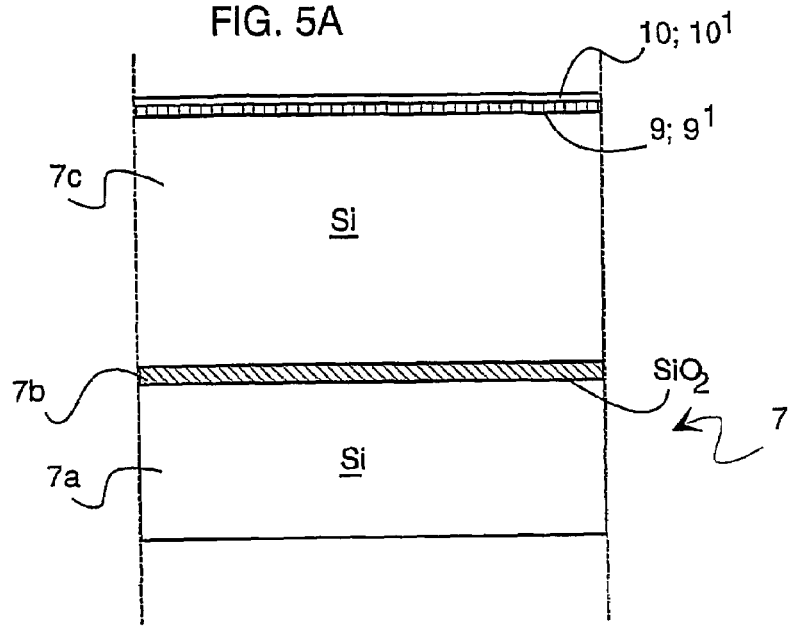
FIGS. 5A and 5B illustrate the manufacture of the waveguide and present two different phases of readiness.

The waveguide 60 of the invention is made onto the planar substrate 7, as has been shown above. The two-step patterning of the core layer required in the realisation can be made, for example, by using the photolithographic manufacturing method described next, presented as a block diagram in FIG. 4. Some manufacturing phases have been illustrated in FIGS. 5A and 5B. However, it has to be noted that the waveguide 60 of the invention can also be realised by many other alternative methods.

Figure 5B:
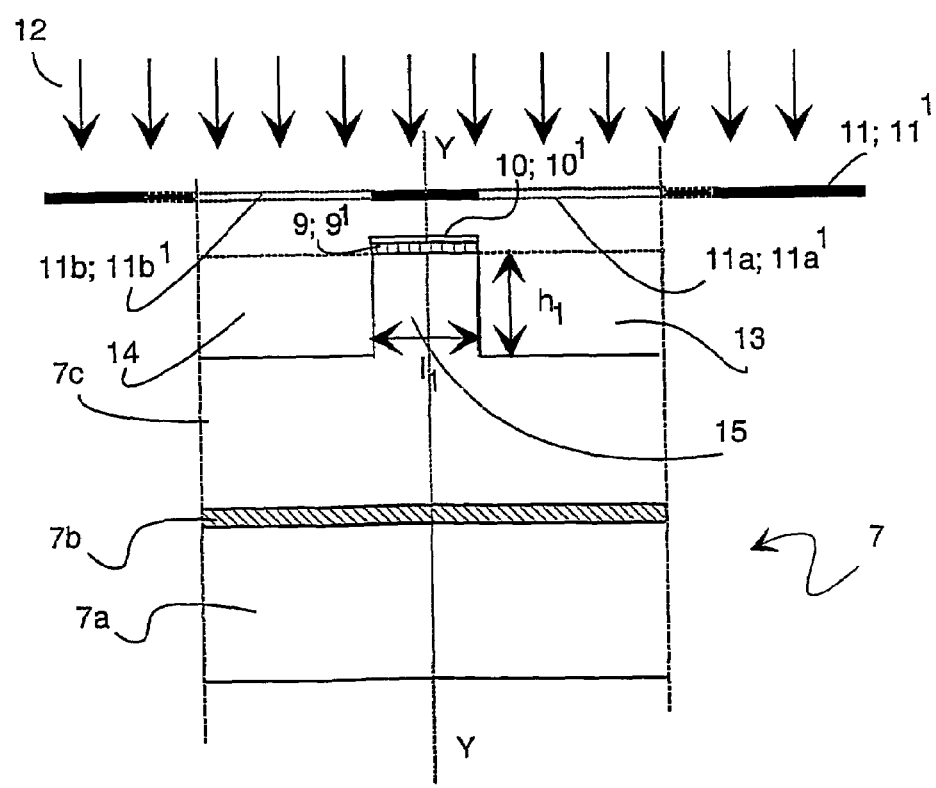

As the waveguide 60 of the invention is manufactured using the photolithographic manufacturing method, the substrate 7 is first taken, to the core layer 7c on top of which the waveguide is intended to be arranged (phase 40). The substrate is a preprocessed wafer, for example, a SOI wafer (cf. FIG. 3). In the first manufacturing phase 41, a hard mask layer 9; $9^1$, such as a silicon dioxide layer, is added to the surface of the wafer. In the second phase 42, a resist, i.e. a light-sensitive protective layer 10; $10^1$ (cf. FIG. 5A) is added on top of the hard mask layer 9; $9^1$. After this, in phase 43, the preprocessed wafer with the first process mask, i.e. in this case the exposure mask 11; $11^1$ is fitted to an exposure device, in which the substrate 7 and the process pattern 11 are located parallel to and at a small distance from each other, and they are exposed (cd. FIG. 5B) . In this case, the light 12, especially UV light, is let to affect the surface layers of the substrate and especially the light-sensitive protective layer 10; $10^1$ through the apertures $11a^1$, $11b^1$ of the exposure mask 11; $11^1$. Thus, a picture of the exposure mask, especially its edges, is arranged to the surface of the wafer. In the next fourth phase 44, the exposed wafer is developed so that the exposed parts of the light-sensitive film are detached. After this, the wafer is etched in the fifth phase 45 that of the areas that became unexposed in the development, first the hard mask layer and then the first grooves 13, 14 can be etched to the desired depth $h_1$. The etchings of the hard mask and the core layer are generally separate process phases, although they have been shown here as one phase for the sake of simplicity. After the etching, the first rib 15 remains between the grooves 13, 14, the height of the rib being $h^1$ and the width $1^1$. In the sixth phase 46 the resist 10; $10^1$ is removed. In the seventh phase 47, the hard mask layer 9; $9^1$ is removed from the unetched areas. Thus, the first processing cycle q=1 has been performed, and it is possible to move to the second processing cycle q=q+1.

The second processing cycle begins principally in the same way as the first processing cycle: a new hard mask layer is first added onto the substrate already once processed, and the light-sensitive protective layer is also added onto the hard mask layer, i.e. the first and second phase 41, 42 are performed again. After this one moves to the third phase 43, and the exposure with the second process mask, i.e. in this case, the exposure mask, is performed. The light is again let to influence the surface layers of the substrate through the apertures of the second exposure mask. In the fourth and fifth phase 44, 45, the substrate is again developed and etched, as the result of which in this application example, all the areas exposed during this second processing cycle are etched until the lower edge of the core layer. The resist is then removed in the sixth phase 46 and the hard mask layer in the seventh phase 47. Thus, also the second processing cycle q=2 has been performed, and the core layer of the waveguide 60 is etched to form a two-step layer.

In the photolithographic manufacturing process described above, a separate hard mask layer is presented to be added at the beginning of both processing cycles and, respectively, to be removed at the end of the same processing cycle. However, this is not always necessary, but the same hard mask layer can be used in both processing cycles. In this case, the deepening of all the grooves already made is continued during the latter processing cycle, and the etching of new grooves is further initiated.

The etching depths and the widths of the ribs restricted by the etched grooves are typically between 0.5–15 μm with a substrate that is a SOI wafer.

In the manufacture of the waveguide of the invention described above, each material layer and the respective step of the waveguide were made successively, beginning from the uppermost layer and the respective step $6^{1a}$, $6^{1b}$ However, the order of the processing cycles and, at the same time, the order of use of the process patterns can be changed. It especially has to be noted that some areas can be over-ecthed so that the sum of the etching depths in these is bigger than the original thickness of the core layer. In this case, the possible continuation of the etching to the layers below the core layer depends on the materials of the layers in question and on the etching method used.

The structure of the waveguide 60 of the invention is next explained in more detail referring to FIGS. 6, 7A, 7B, 7C.

The height of the uppermost layer of the waveguide 60, i.e. the first layer $60^1$ and at the same time the rise $h_{60a}$ of the uppermost step is equal to the height $h_h$ of the ridge $61^1$ of the ridge-type waveguide 61. The first end of the waveguide 60 is connected to the ridge-type waveguide 61 and the second end to the strip waveguide 62. At the connecting point 601 of the waveguide 60 and the ridge-type waveguide 61, the width $l_{60a} = l_{601a}$ of the first layer $60^1$ of the waveguide 60 is equal to the width $l_h$ of the ridge $61^1$ of the ridge-type waveguide. At the connecting point 602 of the waveguide 60 and the strip waveguide 62, the width $l_{60a} = l_{602a}$ of the first layer $60^1$ of the waveguide 60 is equal to the width $l_s$ of the strip waveguide 62. At the connecting points 601, 602 of the waveguides there is no material connecting area or similar, but the core elements consisting of the layers of different waveguides are of the same material, and they connect to each other directly and seamlessly.

In the application example of FIG. 6, the width $l_h$ of the ridge $61^1$ of the ridge-type waveguide 61 is smaller than the width $l_s$ of the strip waveguide 62. Alternatively, depending on the application, the width $l_h$ of the ridge $61^1$ is equal to or bigger than the width $l_s$ of the strip waveguide 62. The width $l_{60a}$ of the first layer of the waveguide 60 is thus arranged to change from the first width $l_{601a}$, which is equal to the width $l_h$ of the ridge $61^1$ of the ridgetype waveguide at the first connecting point 601, to the second width $l_{602a}$, which is equal to the width $l_s$ of the strip waveguide 62 at the second connecting point 602.

The height $h_{60b}$ of the second layer $60^2$ of the waveguide 60 and at the same time the rise of the second step is equal to the height $h_k$ of the base part $61^2$ of the ridge-type waveguide 61. At the connecting point 601 of the waveguide 60 and the ridge-type waveguide 62, the width $l_{60b} = l_{601b}$ of the second layer $60^2$ of the waveguide is equal to the finite width $l_{61k}$ of the base part $61^2$ of the ridge-type waveguide. At the connecting point 602 of the waveguide 60 and the strip waveguide 61, the width $l_{60b} = l_{602b}$ of the second layer $60^2$ of the waveguide 60 is equal to the width $l_s$ of the strip waveguide 62. The width $l_{61k}$ of the base part $61^2$ of the ridge-type waveguide 61 is in principle infinite, but in practice, the second waveguide 60 and its second layer $60^2$ are connected to the base part $61^2$ at the connecting point 601 in some suitable finite width, which is so large that it has no significant influence on the activity of the waveguide. Preferably the width $l_{61k}$ is the width $l_h$ of the ridge $61^1$ multiplied by a constant figure, which is calculated numerically.

The height $h_{60a}$ of the first layer $60^1$ of the waveguide 60 of the invention is thus equal to the height $h_h$ of the ridge $61^1$ of the ridge-type waveguide, as again the height $h_{60b}$ of the second layer $60^2$ is equal to the height hk of the base part $61^2$ of the ridge-type waveguide. The height $h_s$ of the strip waveguide 62 again is the sum of the heights $h_{60a}$ and $h_{60b}$ of the layers $60^1$, $60^2$ of the second waveguide 60, i.e. $h_s = h_{60a} + h_{60b} = h_h + h_k$.

The heights $h_{60a}$, $h_{60b}$ of the layers $60^1$, $60^2$ of the waveguide 60 according to the invention and thus the rises of the steps depend on the height dimensions $h_h$, $h_k$ of the ridge $61^1$ and the base part $61^2$ of the ridge-type waveguide 61 and, respectively, on the height $h_s$ of the strip waveguide 62. As is evident from above, the first layer $60^1$ of the waveguide 60, i.e. the distance of the inner step pair is arranged to narrow (or to widen, respectively) in the direction of travel of light most preferably uniformly and linearly from one width $l_h$ to second width $l_s$ (or vice versa, seen to the opposite direction of propagation of light)

The purpose of the waveguide 60 is to connect two waveguides 61, 62 of different shapes and at least partly with different dimensions to each other. By applying the waveguide 60 of the invention, this is achieved adiabatically in a desired way with as small light propagation losses as possible. In the embodiment example shown, the waveguide 60 and the waveguides 61, 62 connected by it are symmetrical in relation to their vertical middle plane.

The manufacture of the waveguide 60 and the ridge-type waveguide 61 and the strip waveguide 62 connected to it is performed by utilising two, the first and second exposure masks 66, 67 or a corresponding process pattern in two successive processing phases. In FIG. 5, the exposure masks 66, 67 are illustrated at a distance above the substrate 7 and the second waveguide 60 of the invention arranged on it. The next more detailed description of the exposure masks 66, 67 is based on the assumption of the use of the photolithographic patterning described above. However, the same or similar masks can also be applied in connection of other patterning methods.

The width $l_{66a}$ of the first end 66a of the first mask 66 corresponds to the width $l_h$ of the ridge $61^1$ of the ridge-type waveguide 61. From the mask point 601a corresponding to the first connecting point 601, the first mask 66 widens towards the second end 66b, and its width $l_{66}$ is equal to the width $l_{60a}$ of the first layer $60^1$ of the waveguide 60 connecting the ridge-type waveguide 61 and the strip waveguide 62 until the mask point 602a corresponding to the second connecting point 602, from which onwards it in this embodiment widens further in a similar way as between the mask points 601a, 602a. To the direction shown after the second mask point 602a, i.e. to the direction of the strip waveguide 62, the width $l_{66b}$ of the first mask 66 is bigger than the width $l_s$ of the strip waveguide 62 to be processed, and its size is of no significance as such; the strip waveguide 62 is restricted to its final width $l_s$ with the help of the second exposure mask 67, as is evident from the following explanation.

The width $l_{67b}$ of the second end 67*b* of the second exposure mask 67 corresponds to the width $l_s$ of the strip waveguide 62. The second mask 67 widens from the mask point 602*b* corresponding to the second connecting point 602 towards the first end 67*a*, and its width $l_{67}$ is equal to the width $l_{60b}$ of the second layer 60$^2$ of the waveguide 60 connecting the ridge-type waveguide 61 and the strip waveguide 62 until the mask point 601*b* corresponding to the first connecting point 601, from which onwards it in this embodiment widens further in a similar way as between the mask points 601*b*, 602*b*. To the direction shown after the first mask point 601*b*, i.e. to the direction of the ridge-type waveguide 61, the width $l_{67a}$ of the second mask 67 is so much bigger than the width of the ridge-type waveguide 61 that its size has no significant influence on the activity of the waveguide. Thus it can be said that at the connecting point 601, the width $l_{67a}$ of the second mask 67 corresponds to the finite width of the base part 61$^2$ of the ridge-type waveguide 61.

Because the width $l_{67}$ of the second mask 67 at the first connecting point 601 has no significant influence on the operation of the waveguide, the location of the first connecting point 601 is determined only on the basis of the mask point 601*a* of the first mask 66 corresponding to it. The width $l_{66b}$ of the first mask 66 from the second connecting point 602 towards the strip waveguide 62 again has no influence on the operation of the waveguide as long as it is bigger than the width $l_{67b}$ of the second mask 67 at the respective place. The. location of the second connecting point 602 is solely determined on the basis of the intersection points of the edges of the masks 66, 67. In FIG. 6, the connecting point 602 is drawn to become congruent with the mask point 602*b* for simplicity, but this need not necessarily be the case. For example, the second mask 67 can continue to narrow for a short range onwards from the mask point 602*b* towards the strip waveguide 62 so that also the strip waveguide connected to the waveguide 60 narrows respectively.

Because of the finite mask alignment accuracy, the masks 66, 67 or the respective process patterns can slightly move in relation to each other as the waveguide is being manufactured. However, the operation of the waveguide 60 does not significantly change because of small alignment errors, because on the basis of what has been said above, it is not necessary to align any mask points to each other in an absolutely accurate manner. At most, the alignment errors slightly move the connecting points 601 and 602 in the longitudinal direction of the waveguide and make the waveguide 60 slightly asymmetrical in relation to its longitudinal middle axis. By using mask patterns that widen and narrow sufficiently flatly, the waveguide 60 stays sufficiently adiabatic also in this case.

The first and second exposure mask 66, 67 are used in the manufacture of the waveguide 60 and the related waveguides 61, 62. In the manufacture, in the etching step of the first processing cycle following the use of the first mask 66 the etching is performed to the first depth $h_1 = h_h = h_{60a}$ so that the first layer 60$^1$ of the waveguide 60 and the ridge 61$^1$ of the first ridge-type waveguide 61 can be separated from the core layer 7*c* on the substrate 7. The areas 64*a*, 64*b* removed in the first etching step are marked with broken lines in FIGS. 7A, 7B and 7C. In the etching step of the second processing cycle following the use of the second mask 67 the core layer is etched so that at the edges of the strip waveguide the etching extends through the whole core layer (to the depth $h_s$), and at the same time, the second layer 60$^2$ of the third waveguide 60 is overetched through the remaining thickness $h_{60b}$ of the core layer. The second etching depth $h_2$ of the second etching phase is different in different areas, due to overetching. The areas 65*a*, 65*b* removed in the second etching step are marked with broken lines in FIGS. 7B and 7C.

The waveguide 60 of the invention can also be realised by using a preferable first varied manufacturing method, compared with the previous method. In this case, the exposure masks 66 and 67 are used in reverse order in relation to the previous method, and in addition, a common hard mask layer is used in connection of them. Thus, the removal of the hard mask and the adding of a new hard mask is passed between the processing cycles. In the etching step of the first processing cycle following the use of the mask 67, the core layer is etched to the depth $h_{60b}$, and in the etching step of the second processing cycle following the use of the mask 66, the core layer is etched to the depth $h_{60a}$. The latter etching step continues the etching of all areas etched in the first processing cycle (the edges of the strip waveguide and the edges of the second layer of the waveguide 60) until the lower edge of the core layer and, simultaneously, it etches the areas 64*a* and 64*b* surrounding the ridge-type waveguide and the areas between the adjacent steps 6; 6$^{1a}$, 6$^{2a}$ and 6; 6$^{1a}$, 6$^{2a}$ to the depth $h_h = h_{60a}$. With this method, the final result obtained will be the same structure as with the previous method, but in this way each etching phase etches to the same depth in all areas, and thus such an overetching phase is avoided, in which the etching in some areas tends to pass the lower edge of the core layer.

In relation to what is explained above, the waveguide 60 can also be realised with the help of a second and third preferable varied manufacturing method. In the second varied manufacturing method, the width $l_{60b}$ of the second layer of the waveguide 60 and the width $l_{67}$ of the second mask 67 corresponding to it are arranged as a constant, which is bigger than the width $l_h$ of the ridge of the ridge-type waveguide 61, which is equal to the width $l_s$ of the strip waveguide 62. In this case, the width $l_{60a}$ of the first layer of the waveguide 60 and the width $l_{66}$ of the first mask 66 corresponding to it are arranged to widen from the width of the first mask point 601, i.e. the width $l_h$ of the ridge of the ridge-type waveguide 61 towards the strip waveguide. In a third varied manufacturing method, the width $l_{60a}$ of the first layer of the waveguide 60 and the width $l_{66}$ of the first mask 66 corresponding to it are arranged as a constant, which is equal to the width $l_s$ of the strip waveguide 62 at the second connecting point 602. In this case, the width $l_{60b}$ of the second layer of the waveguide 60 and the width $l_{67}$ of the second mask 67 corresponding to it are arranged to narrow from the width of the first mask point 601, i.e. the finite width $l_{61k}$ of the base part 61$^2$ of the ridge-type waveguide 61 towards the strip waveguide and slightly past the second mask point 602 so that no very high requirements be set to the mask alignment. In the second and third varied manufacturing method, the other dimensions of the waveguide 60 are kept the same and/or they are arranged to change, as is explained above in connection of FIGS. 6, 7A, 7B and 7C.

A considerable advantage of the waveguide 60 and its manufacturing process is that no especially high alignment accuracy is needed between the two process patterns used, as has been demonstrated above. Only one process pattern, or a corresponding mask, determines the dimensions (i.e. especially the width and the length, but, in principle, also the height) of the waveguide 61, 62 to be connected to the waveguide 60 of the invention. Because of the adiabatic property of the waveguide 60 and the small angles of crossing of the edges of the process patterns, small alignment errors do not largely influence the transfer of light between the waveguides 61, 62 to be connected.

The invention is not limited to concern the above presented embodiment examples only, but many variations are possible within the inventional idea determined by the claims.

REFERENCE PUBLICATIONS

/1/ Hiroshi Nishihara, Masamitsu Haruna and Toshiaki Suhara: "Optical integrated circuits", McGraw-Hill Book Company, ISBN 0-07-046092-2, 1989

/2/ Denis Donlagic and Brian Culshaw: "Propagation of the fundamental mode in curved graded index multimode fiber and its application in sensor systems", Journal of Lightwave Technology, vol 18, pp. 334–342, 2000

The invention claimed is:

1. A waveguide, which is part of an integrated optical circuit, the waveguide being arranged onto a planar substrate and having a core section propagating light in a certain direction of propagation, characterised in that the waveguide is a conversion waveguide (60) between a ridge-type waveguide (61) and a strip waveguide (62), in said conversion waveguide the core section being made of the one and same material so that a cross-section of the core section transverse to the direction of propagation (z) of light is two-step (6; $6^{1a}$, $6^{2a}$; $6^{1b}$, $6^{2b}$) from both edges (60a, 60b), said conversion waveguide comprising first and second layers ($60^1$, $60^2$) of different widths ($l_{60a}$, $l_{60b}$), a height ($h_{60a}$) of the first layer ($60^1$) being equal to a height of a ridge ($61^1$) of the ridge-type waveguide (61), and a height ($h_{60b}$) of the second layer ($60^2$) being equal to a height of a base part ($61^2$) of the ridge-type waveguide (61), a sum of the heights ($h_{60a}$, $h_{60b}$) of the first and second layers ($60^1$, $60^2$) being equal to a height of the strip waveguide (62), the widths of the two layers (601, 602) being arranged to change uniformly between the ridge-type and strip waveguides to be connected for fitting the ridge-type and strip waveguides together laterally.

2. The waveguide according to claim 1, characterised in that the waveguide (60) is made of semiconductor material.

3. The waveguide according to claim 2, characterised in that the waveguide (60) is made onto a SOI substrate.

4. The waveguide according to claim 1, characterised in that the widths ($l_{60a}$, $l_{60b}$) of the layers ($60^1$, $60^2$) of the conversion waveguide (60) are arranged to change linearly between the ridge of the ridge-type waveguide (61) and a rectangular core section of the strip waveguide (62) of different widths for connecting the ridge-type and strip waveguides together with the conversion waveguide (60).

5. A method for manufacturing an integrated optical circuit onto a substrate, characterised in that a conversion waveguide (60) is manufactured between a ridge-type waveguide (61) and a strip waveguide (62) onto such a substrate (7), on which there is a light-propagating core section (7c), in which method the core layer (7c) is controllably thinned in two stages for forming two different steps on both sides of the conversion waveguide so that different process patterns are utilised in both thinning stages, edges of which determine a location of the edges of the steps of the waveguide on the substrate, so that the result obtained is a waveguide structure, which is two-step (6; $6^{1a}$, $6^{2a}$; $6^{1b}$, $6^{2b}$) from both edges (60a, 60b) transverse to a direction of propagation of light, in which the conversion waveguide (60) is provided with first and second layers ($60^1$, $60^2$) of different widths ($l_{60a}$, $l_{60b}$) so that a height ($h_{60a}$) of the first layer ($60^1$) is arranged to be equal to a height of a ridge ($61^1$) of the ridge-type waveguide (61), and a height ($h_{60b}$) of the second layer ($60^2$) is arranged to be equal to a height of a base part ($61^2$) of the ridge-type waveguide (61), and in which a sum of the heights ($h_{60a}$, $h_{60b}$) of the first and second layers ($60^1$, $60^2$) is arranged to be equal to a height of the strip waveguide (62), and the widths of the two layers (601, 602) are arranged to change uniformly between the ridge-type and strip waveguides (61, 62) to be connected for fitting the ridge-type and strip waveguides together in a lateral direction.

6. The method according to claim 5, characterised in that the waveguide (5) is manufactured onto a suitable finished substrate (7).

7. The method according to claim 5, characterised in that one common hard mask layer (9; $9^1$) is used for providing at least two different process patterns to the core layer (7c) of the substrate.

8. The method according to claim 6, characterised in that one common hard mask layer (9; $9^1$) is used for providing at least two different process patterns to the core layer (7c) of the substrate.

* * * * *